United States Patent [19]

Hibst et al.

[11] Patent Number: 5,084,319
[45] Date of Patent: Jan. 28, 1992

[54] DISK-SHAPED MAGNETIC RECORDING MEDIA, THEIR PRODUCTION AND INFORMATION STORES CONTAINING THESE RECORDING MEDIA

[75] Inventors: Hartmut Hibst, Ludwigshafen; Arend Werner, Bad Duerkheim; Joachim Hack, Ludwigshafen; Heinrich Mannsperger, Dossenheim; Michael Hitzfeld, Gruenstadt; Werner Grau, Bobenheim-Roxheim; Guenter Heil, Ludwigshafen; Norbert Holl, Battenberg, all of Fed. Rep. of Germany

[73] Assignee: BASF Aktiengesellschaft, Ludwigshafen, Fed. Rep. of Germany

[21] Appl. No.: 435,680

[22] Filed: Nov. 14, 1989

[30] Foreign Application Priority Data

Dec. 17, 1988 [DE] Fed. Rep. of Germany ....... 3842635

[51] Int. Cl.$^5$ .............................................. G11B 23/00
[52] U.S. Cl. .................................. 428/64; 204/192.2; 206/444; 428/336; 428/408; 428/694; 428/695; 428/900
[58] Field of Search .................. 428/64, 65, 408, 694, 428/695, 900, 336; 204/192.2; 206/444

[56] References Cited

U.S. PATENT DOCUMENTS

| | | | |
|---|---|---|---|
| 3,353,166 | 11/1967 | Brock | 340/174.1 |
| 3,767,369 | 10/1973 | Barlow et al. | 117/239 |
| 4,029,541 | 6/1977 | Barlow et al. | 427/130 |
| 4,268,369 | 5/1981 | Barlow et al. | 204/192 D |
| 4,277,540 | 7/1981 | Aine | 428/627 |
| 4,587,157 | 5/1986 | Brock et al. | 428/216 |
| 4,693,908 | 9/1987 | Rossi et al. | 428/695 |
| 4,709,816 | 12/1987 | Matsumoto et al. | 428/695 |
| 4,759,954 | 7/1988 | Kubota et al. | 428/695 |
| 4,816,334 | 3/1989 | Yokoyama et al. | 428/408 |
| 4,840,843 | 6/1989 | Sano et al. | 428/695 |
| 4,985,295 | 1/1991 | Ishihara et al. | 428/213 |

FOREIGN PATENT DOCUMENTS

| | | |
|---|---|---|
| 0170312 | 2/1986 | European Pat. Off. . |
| 0212394 | 3/1987 | European Pat. Off. . |
| 1-182920 | 7/1989 | Japan ........................ 428/695 |
| WO88/05953 | 8/1988 | World Int. Prop. O. . |

OTHER PUBLICATIONS

IEEE Transactions on Magnetics, vol. MAG-22, No. 5, Sep. 1986.
IBM Technical Disclosure Bulletin, vol. 26, No. 9, Feb. 1984, pp. 4455, 4839.

*Primary Examiner*—Paul J. Thibodeau
*Attorney, Agent, or Firm*—Keil & Weinkauf

[57] ABSTRACT

Disk-shaped magnetic recording media essentially consisting of a flexible substrate, a thin ferromagnetic metal film applied to one or both sides and a protective or antifriction layer present on this metal film and essentially consisting of carbon, a process for the production of these recording media and information stores containing these recording media.

4 Claims, No Drawings

DISK-SHAPED MAGNETIC RECORDING MEDIA, THEIR PRODUCTION AND INFORMATION STORES CONTAINING THESE RECORDING MEDIA

BACKGROUND OF THE INVENTION

1. Field of the Invention

The present invention relates to disk-shaped magnetic recording media, essentially consisting of a flexible substrate, a thin ferromagnetic metal film applied to one or both sides and a protective or antifriction layer present on this metal film and essentially consisting of carbon, a process for the production of these recording media and information stores which contain these recording media.

Disk-shaped magnetic recording media which have a magnetic layer, consisting of a magnetic powder material and an organic binder, on a flexible substrate are known in particular as floppy disks and are widely used. To increase the information density, it has often been proposed that the pigment/binder magnetic layer be replaced by such a layer consisting of ferromagnetic material in the form of a thin metal film. As a result of the increase in coercive force made possible by a thin metal film on the one hand and, on the other hand, the reduction of the layer thickness to less than 1,000 nm, made possible by the greater magnetization of the ferromagnetic metals or alloys used, a substantially higher storage density of the recording medium can be achieved. These thin metal films are preferably produced by PVD methods, such as cathode sputtering or vapor deposition. However, these thin metal films must be protected both against corrosion and against the mechanical stress due to the head. When selecting such protective layers, however, it is necessary to ensure that neither application of the protective layer nor the protective layer itself has any adverse effect on the magnetic layer.

2. Description of the Related Art

Many suggestions have been made for solving these problems. For example, U.S. Pat. No. 3,767,369 describes the application of a rhodium protective layer for improving the hardness and the anti-friction properties; it is necessary to apply a tin/nickel intermediate layer to improve the adhesion of the rhodium to the magnetic layer, which is too low. This process does not provide the protective layer properties now required, nor is the application of the said layer simple and without problems. Where the metallic magnetic layer contains cobalt, it has been proposed to heat this magnetic layer in the air at a predetermined humidity and hence to oxidize the surface (U.S. Pat. Nos. 3,353,166 and 4,029,541). However, such a process has particular disadvantages. Thus, the heating process required to produce the stated protective layers may influence not only magnetic properties of the recording layer itself but also conventional lower or intermediate layers in such a way that these in turn adversely affect the properties of the magnetic layers.

Furthermore, the application of liquid oligomers, for example of perfluoropolyethers, to the magnetic layer to be protected, by immersion or spin-coating, is disclosed in, for example, U.S. Pat. No. 3,778,308. However, the disadvantage of this process is that the lubricant migrates increasingly in an outward direction, for example under the influence of the centrifugal force and of the air flow during operation of the recording media, so that, with the decrease in lubrication, the wear and the friction increase very sharply and mutually influence one another.

In other processes, various protective layers are applied under reduced pressure, generally by sputtering, for example, according to U.S. Pat. No. 4,277,540, layers of gold, tantalum, niobium, platinum, chromium, tungsten and rhodium and the nitrides or carbides of silicon, of zirconium, of hafnium and of titanium and, according to U.S. Pat. No. 4,268,369, layers of silica. Furthermore, East German Patent 109,101 describes protective layers consisting of carbon layers grown under reduced pressure, for magnetic stores having a thin metal film. Special embodiments of such protective carbon layers are described in IEEE Trans. Mag., Vol. MAG-22, No. 5, September 1986, pages 999–1001 and, inter alia, also in WO 88/05953 or EP-A 273330. With these modified protective layers based on carbon, the abrasion properties of recording media having thin metal films can be improved so that they reach a service life of up to 11 hours, ie. up to 0.2 million revolutions, at a speed of 300 rpm. However, the specifications require the service life of disk-shaped recording media to be not less than 560 hours or 10 million revolutions, the head being continuously in contact with the recording track.

SUMMARY OF THE INVENTION

It is an object of the present invention to provide disk-shaped magnetic recording media which have a thin ferromagnetic film on one or both sides of a flexible substrate and a friction-reducing layer consisting predominantly of carbon on this metal film, and which in particular have a long service life. It is a further object of the present invention to provide a process for the production of such recording media.

We have found that this object is achieved and that disk-shaped magnetic recording media essentially consisting of a flexible substrate and a thin ferromagnetic film applied to one or both sides and a 10–100 nm thick friction-reducing layer present on this metal film and consisting predominantly of carbon have the required long service life if the friction-reducing layer has open micropores which contain a liquid lubricant.

DESCRIPTION OF THE PREFERRED EMBODIMENTS

The present invention furthermore relates to a process for the production of these special magnetic recording media, wherein a 10–100 nm thick carbon layer is applied to a disk-shaped recording medium essentially consisting of a flexible substrate and a thin ferromagnetic metal film by DC magnetron sputtering under from $1 \times 10^{-3}$ to $5 \times 10^{-2}$ mbar of argon, and the open micropores formed in the carbon layer are then laden with a liquid lubricant.

The novel magnetic recording media have a surprisingly long service life which, under specified operating conditions, is more than 560 hours and hence permits more than 10 million revolutions. This high load capacity of the novel recording media is due to the open micropores which are present in the carbon protective layer and which are laden with liquid lubricants known per se. The pores detectable in the surface of the carbon layer by means of transmission electron micrographs, and also cracks, have a lateral dimension of about 1–10 nm. They extend to a depth of up to 90% of the layer thickness, as can be demonstrated by hydrogen analysis, resolved with respect to layer depth, of a lubricant, eg. butoxyethyl stearate, which has penetrated into the open micropores, by means of a nuclear reaction $^{15}N(H,\alpha\gamma)^{12}C$.

This embodiment of the friction-reducing carbon layer, which embodiment distinguishes the novel recording media, is achieved in a surprisingly simple manner by producing the carbon layer by DC magnetron sputtering under from $1 \times 10^{-3}$ to $5 \times 10^{-2}$ mbar of argon and then loading the resulting carbon layer with the liquid lubricant. The pore volume of the friction-reducing carbon layer increases with increasing argon pressure and is from 5 to 60 percent, preferably 5 to 40 percent of the layer volume. To determine the proportion of open micropores, a 100 nm thick carbon layer is applied to a glass substrate by sputtering, a strip being covered with a microscopy cover glass. The layer thickness d* is measured at the step formed by the cover, using a profilometer (Alpha Step 200 from Tencor). The relative mass occupation factor $Q_x$ itself is determined by angle-disperse X-ray fluorescence of the carbon in the microprobe, the data being based on a reference layer having the values $d_R$ and $Q_R$. The reference layer is produced by sputtering under an argon pressure of $5 \times 10^{-4}$ mbar and must therefore be considered as pore-free. The volume fraction of the micropores $V_M$ in percent by volume is thus obtained in accordance with $$V_M = 100 \left[1 - (Q_x \cdot d_R)/(Q_R \cdot d_x)\right].$$

Furthermore, the high electrical resistance of the layers produced by sputtering under high gas pressures compared with the conventional gas pressures of $5 \times 10^{-4}$ mbar is a result of the high porosity. Lubrication is effected in an advantageous manner if the recording medium provided with the special carbon layer is impregnated either by immersion in, or spraying with, a solution of the lubricant or by contact with the fleece present in the conventional jackets for flexible disks, which fleece has been impregnated beforehand with the lubricant. Fleece lubrication has the advantage that, after partial or complete abrasion by the head, the lubricant present in the micropores of the carbon layer is constantly replenished by the lubricant reservoir present in the fleece liner. The general structure of such information stores, which are generally referred to as floppy disks, is known, ie. the magnetic recording medium is contained in a protective jacket and a fleece liner is present between the two. During operation of this information store, which is permitted by appropriate openings in the protective jacket, both for driving and for positioning the recording medium and for head access for recording and playback of the information, the fleece liner effects cleaning and, where it is impregnated with lubricant, also lubrication. However, this conventional procedure has the disadvantage that a different amount of lubricant is released depending on time and use. This disadvantage is overcome with the aid of the novel recording medium since the micropores act as an intermediate reservoir, and uniform and constant lubrication is ensured as a result of the lubricant being supplied from these micropores to the surface of the carbon layer.

The lubricants suitable for treatment of the novel recording media are functional perfluoropolyether compounds, fatty acids and fatty esters and fluorinated silicones or mixtures of these compounds. Preferably used functional perfluoropolyether compounds are bifunctional derivatives which have polar or reactive terminal groups and can undergo a physicochemical interaction with the micropore walls to be lubricated, for example compounds having terminal hydroxyl groups (eg. Fomblin Z-DOL from Montefluos), carbonyl groups (eg. Fomblin Z-DIAC from Montefluos), carboxyl groups (eg. Fomblin Z-DEAL from Montefluos), isocyanate groups (eg. Fomblin Z-DISOC from Montefluos) or terminal C-H ring systems (eg. Fomblin AM 2001 from Montefluos). From the group consisting of the fatty acids, liquid compounds have proven particularly useful, for example isostearic acid and oleic acid. In the case of the fatty esters, liquid compounds which contain branched fatty acids and/or branched fatty alcohols are preferred, for example isotridecyl stearate or ether alcohols, eg. butoxyethyl stearate.

The substrate for the disk-shaped magnetic recording media consists of flexible films of polyesters, eg. polyester terephthalate (PET), of polyimide (PI), of polyethersulfone (PES) or of polyetheretherketone (PEEK).

Inorganic or metallic intermediate layers, for example chromium or titanium, or organic intermediate layers which may be filled with fine inorganic particles, eg. $SiO_2$, may be applied to these substrates, the thin ferromagnetic metal film then being deposited on the said intermediate layers in a thickness of from 10 to 1,000 nm by means of DC magnetron sputtering. Suitable magnetic materials are iron, nickel, cobalt or their alloys and alloys of cobalt and of chromium.

The friction-reducing carbon layer is applied by the novel process, advantageously immediately after deposition of the ferromagnetic film, in the same apparatus. The target used is graphitic carbon. The target power density is from 3 to 12 watt/cm$^2$ and the argon sputtering pressure is from $1 \times 10^{-3}$ to $5 \times 10^{-2}$ mbar.

These novel magnetic recording media are then punched into any desired format (for example $3\frac{1}{2}''$ or $5\frac{1}{4}''$) and packed in the appropriate jackets or cartridges, fleeces treated beforehand with a lubricant being used. The optimum amount of lubricant in the fleece must be tailored both to the type of fleece and to the morphology of the carbon layer. For the system according to the invention, it is from 1 to 5, preferably from 2.1 to 3.3, g per m$^2$ of fleece surface (without solvent).

EXAMPLE

A 200 nm thick $Co_{80}Cr_{20}$ film is deposited by DC magnetron sputtering on a polyimide film having a thickness of 50 μm and a roughness $R_a$ of 2 nm, the argon pressure being $8 \times 10^{-4}$ mbar. A 40 nm thick carbon layer was deposited on this film, likewise by DC magnetron sputtering, the argon pressure being $8 \times 10^{-3}$ mbar.

The proportion of micropores was determined as 10% by volume. Transmission electron micrographs of a correspondingly produced self-supporting layer (d=40 nm) indicate a mean diameter of the micropores of less than 3 nm.

The lubricant used was a 5% strength solution of butoxyethyl stearate in n-hexane. This was sprayed for 3 seconds onto a 170 μm thick polyester fleece (Kendall 192 from Kendall, Belgium) so that the resulting amount of lubricant (without solvent) was 2.1 g/m$^2$ of fleece surface $5\frac{1}{4}''$ disks were punched from the film material coated by sputtering with $Co_{80}Cr_{20}$ and carbon, and these disks were packed in a commercial jacket and provided with the abovementioned fleece material treated with lubricant A service life of more than 10 million revolutions on a track was obtained in a drive at 300 rpm using a spherical write/read head and a head contact pressure of 0.18 N. The service life was specified by the decrease in the RMS level of the 2 F signal by 15% of the initial value.

COMPARATIVE EXPERIMENT

5¼" disks were punched from the film material from Example 1, which material had been coated by sputtering with $Co_{80}Cr_{20}$ and carbon, and these disks were packed in a commercial jacket and provided with the unlubricated fleece material mentioned in Example 1. Under the test conditions of Example 1, a service life of only 0.2 million revolutions on a track resulted.

We claim:

1. A disk-shaped magnetic recording medium consisting essentially of a flexible substrate and a thin ferromagnetic metal film applied to one or both sides and a 10-100 nm thick friction-reducing layer present on this metal film and consisting of carbon, wherein the friction-reducing layer has open micropores which contain a liquid lubricant.

2. A disk-shaped magnetic recording medium as claimed in claim 1, wherein the micropore volume fraction of the friction-reducing layer, which fraction is determined by comparison of the layer thicknesses with the mass occupation factor determined by X-ray fluorescence measurement, is from 5 to 60%.

3. A process for the production of a disk-shaped magnetic recording medium, consisting essentially of a flexible substrate and a thin ferromagnetic metal film layer consisting essentially of carbon having a thickness of 10-100 nm, comprising depositing said carbon layer on said thin ferromagnetic film by means of DC magnetron sputtering under a vacuum pressure of $1 \times 10^{-3}$ to $5 \times 10^{-2}$ mbar of argon whereby pores are formed in said carbon layer and filling said pores with liquid lubricants.

4. A magnetic information store consisting of a magnetic recording medium as claimed in claim 1 in a protective jacket which is closed on all sides, said jacket consisting of resilient material and having openings for driving and positioning the recording medium and for recording and playback of information and on whose inside, facing the recording medium, is applied a fleece liner impregnated with lubricant, wherein, when the magnetic information store is used, the stock of liquid lubricant in the open micropores of the friction-reducing carbon layer is replenished from the lubricant reservoir of the fleece liner.

* * * * *